(12) United States Patent
Archbold et al.

(10) Patent No.: US 9,194,119 B2
(45) Date of Patent: Nov. 24, 2015

(54) PEEL AND STICK DECOUPLING MEMBRANE

(71) Applicant: ST Global Partners, LLC, San Diego, CA (US)

(72) Inventors: Carl Thomas Archbold, San Diego, CA (US); Scott Burton Harter, Corinth, TX (US)

(*) Notice: Subject to any disclaimer, the term of this patent is extended or adjusted under 35 U.S.C. 154(b) by 146 days.

(21) Appl. No.: 14/046,885

(22) Filed: Oct. 4, 2013

(65) Prior Publication Data

US 2014/0099464 A1    Apr. 10, 2014

Related U.S. Application Data

(60) Provisional application No. 61/709,984, filed on Oct. 4, 2012, provisional application No. 61/869,636, filed on Aug. 23, 2013.

(51) Int. Cl.
| | |
|---|---|
| *E04B 1/64* | (2006.01) |
| *B29C 51/26* | (2006.01) |
| *E04F 15/18* | (2006.01) |
| *B29C 51/00* | (2006.01) |

(52) U.S. Cl.
CPC ............ *E04B 1/64* (2013.01); *B29C 51/268* (2013.01); *E04F 15/182* (2013.01); *E04F 15/185* (2013.01); *B29C 51/00* (2013.01); *Y10T 428/14* (2015.01); *Y10T 428/1486* (2015.01); *Y10T 428/24322* (2015.01); *Y10T 428/28* (2015.01)

(58) Field of Classification Search
CPC .... E04F 15/182; E04F 15/185; B29C 51/268; B29C 51/00; E04B 1/64; Y10T 428/28; Y10T 428/24322; Y10T 428/1486
See application file for complete search history.

(56) References Cited

U.S. PATENT DOCUMENTS

| | | | | |
|---|---|---|---|---|
| 2,043,987 | A * | 6/1936 | Brown | 428/132 |
| 3,011,930 | A * | 12/1961 | Dworak | 428/137 |
| 4,803,111 | A * | 2/1989 | Mansell | 428/139 |
| 5,965,235 | A * | 10/1999 | McGuire et al. | 428/156 |
| 6,434,901 | B1 | 8/2002 | Schluter | |
| 6,858,285 | B1 * | 2/2005 | Hamilton et al. | 428/174 |
| 2013/0071589 | A1 * | 3/2013 | Hannington et al. | 428/35.7 |

* cited by examiner

*Primary Examiner* — Patricia L Nordmeyer
(74) *Attorney, Agent, or Firm* — Genius Patent APC; Bruce Hare

(57) ABSTRACT

A decoupling underlayment membrane is described. The decoupling underlayment membrane includes: a set of mortar cavities; a set of through holes; and an adhesive layer coupled to an exterior surface of each mortar cavity in the set of cavities. A method of manufacturing a decoupling underlayment membrane includes: retrieving a membrane sheet; thermoforming a set of cavities into a top surface of the membrane sheet; pressing a set of through holes into the membrane sheet. A decoupling underlayment membrane includes: a set of starfish-shaped cavities arranged in a first repeating pattern and formed into a top surface of the membrane; a set of through holes arranged in a second repeating pattern; and a peel and stick adhesive layer coupled to a bottom surface of the membrane.

13 Claims, 8 Drawing Sheets

700

700

PEEL AND STICK DECOUPLING MEMBRANE

CROSS-REFERENCE TO RELATED APPLICATIONS

This application claims priority to U.S. Provisional Patent Application Ser. No. 61/709,984, filed on Oct. 4, 2012 and U.S. Provisional Patent Application Ser. No. 61/869,636, filed on Aug. 23, 2013.

BACKGROUND OF THE INVENTION

Conventional underlayment membranes use so-called "dovetail" cavities situated in longitudinal and transverse directions to decrement stress exerted on the external surface of installed flooring tiles, and use grooves formed in longitudinal and transverse directions behind "dovetail" cavities to channel water (such as moisture and vapor) above a subfloor. Additionally, conventional underlayment membranes require fine-mesh screen fabric webbings attached to the underside of the membranes to anchor mortar so that the membranes can be adhered to the subfloor with interlocked mortar formed on the webbings.

These characteristics of conventional underlayment membranes result in several disadvantages. First, the "dovetail" cavities, which have overhangs and undercuts, cause the manufacturing of the membranes to be quite expensive, since specially made machines must be used for the manufacturing. Second, a flooring installer has to apply mortar onto the underside webbings for the webbings to adhere to a subfloor in order to install flooring tiles on the membranes, which is inconvenient and incurs additional installation cost. Third, grooves are formed in longitudinal and transverse directions, although forming channels for water, are still fairly restrictive, as water channeling is restricted to be only along longitudinal and transverse directions.

In addition, the presence of perpendicular grooves may limit the structural integrity of the membrane in such a way that cracks or other defects form along the grooves due to a lack of support from the membrane.

Therefore, there is a need for a self-adhesive decoupling underlayment membrane with a set of water displacement channels that is able to provide appropriate support for flooring or other finished surfaces (e.g., walls, ceilings, etc.).

BRIEF SUMMARY OF THE INVENTION

Some embodiments provide a decoupling underlayment membrane that may be used during installation of flooring such as ceramic tile flooring. The underlayment membrane may include a set of cavities formed into the top surface of the membrane such that thin set mortar may be applied to the top of the membrane in order to adhere the flooring. The areas surrounding the cavities may provide a fluid pathway on the underside of the membrane during and after installation. The underlayment membrane may include a set of through holes, each of which allows an amount of mortar to pass through the hole during installation such that the layer of thin set mortar is securely coupled to the underlayment (and, in turn, the subfloor).

The underlayment membrane may further include a peel and stick adhesive layer on the bottom surface of the membrane, such that the membrane may be adhered directly to a subfloor. The peel and stick layer may include a release liner that is removed just before installation to expose the adhesive on the bottom surface of the peel and stick layer.

A first exemplary embodiment of the invention provides a decoupling underlayment membrane. The decoupling underlayment membrane includes: a set of mortar cavities; a set of through holes; and an adhesive layer coupled to an exterior surface of each mortar cavity in the set of cavities.

A second exemplary embodiment of the invention provides a method of manufacturing a decoupling underlayment membrane. The method includes: retrieving a membrane sheet; thermoforming a set of cavities into a top surface of the membrane sheet; pressing a set of through holes into the membrane sheet.

A third exemplary embodiment of the invention provides a decoupling underlayment membrane. The decoupling underlayment membrane includes: a set of starfish-shaped cavities arranged in a first repeating pattern and formed into a top surface of the membrane; a set of through holes arranged in a second repeating pattern; and a peel and stick adhesive layer coupled to a bottom surface of the membrane.

The preceding Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features. Broadly, embodiments of the present invention generally provide an underlayment membrane used for installing flooring on subfloor (e.g., concrete, wood slab, etc.). The membrane may be a peel-and-stick underlayment membrane that effectively decouples the flooring underside surface from the subfloor so as to achieve superior stress-decoupling and decrementing and water-channeling, as well as numerous other advantages.

Figure 1:
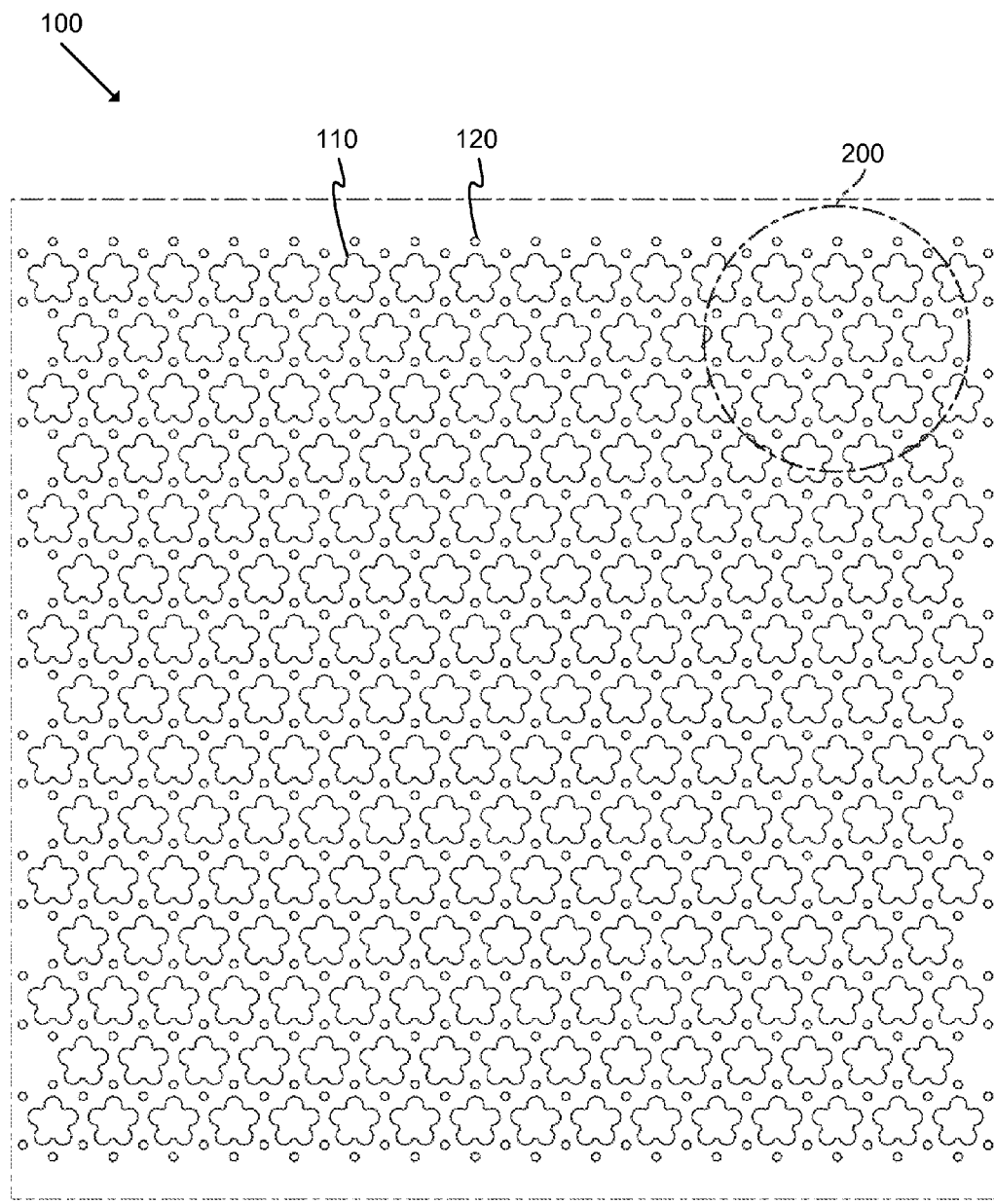
FIG. 1 illustrates a top view of a decoupling membrane according to an exemplary embodiment of the invention.

FIG. 1 illustrates a top view of a decoupling membrane 100 according to an exemplary embodiment of the invention. As shown, the decoupling membrane may include multiple cavities 110 spread through the membrane 100 using various appropriate layouts (e.g., staggered, interlocking, etc.). In some embodiments, each of the cavities 110 may be shaped as a five-pronged "star". Such a cavity shape may allow for interlocking (or nearly interlocking) layouts that allow water or other fluid to pass through channels formed among the spaces between the cavities, thus allowing for improved drainage. Different embodiments may include different cavity shapes.

The cavities may be sized appropriately for different types of mortar that may be associated with different types of flooring or different installation locations (and/or other appropriate factors). For instance, in some embodiments, each cavity may be approximately three quarters of an inch across and one quarter inch deep.

The underside, or the bottom surface, of each cavity may have a textured surface, such as a plastic surface having hair cell texture. Such a textured surface may improve adhesive bonding when the membrane is placed against a subfloor, thus allowing the entire membrane sheet to be firmly adhered to the subfloor without any need to apply mortar (and/or other materials) to the bottom surface of the membrane.

The bottom surface of the cavities may be covered by a release liner (not shown) that forms a peel-and-stick layer.

Situated among the cavities are multiple "punch" holes 120, which may function as "escaping" holes for mortar (e.g., thin-set mortar) applied on the top plane of the membrane 100. The holes 120 may be sized appropriately (e.g., one-eight inch diameter) such that an appropriate amount of mortar is able to pass through the hole (i.e., enough mortar to form a bond, but not so much mortar that the drainage pathways are blocked).

In some embodiments, the membrane 100 may be made from polyvinyl chloride (PVC). Such a membrane may be provided in semi-rigid sections (e.g., eighteen inch by twenty-four inch sections of twenty-six mil PVC, where the sections may be made from a bisected forty inch by forth-eight inch thermoformed panel, one-foot square sections, etc.). Alternatively, the membrane may be provided as a roll, where an appropriate width (e.g., twenty-four inches) and length of membrane may be wrapped about a cylindrical core allowing installation across larger areas.

The membrane 100 may be formed in some embodiments by taking a sheet of material (e.g., twenty inches by twenty-six inches) and pressing a repeating pattern onto the sheet using a thermoforming tool (e.g., by pressing a heated die into the sheet). Such a pattern may repeat at various appropriate intervals (e.g., a one inch horizontal interval and a one inch vertical interval). The sheet may then be trimmed to a final size. Alternatively, a pattern may be repeatedly formed into a length of flexible material and the material may be rolled about a core. In addition, an adhesive layer may be applied to the bottom surface of the membrane. The adhesive layer may include a release liner that may be removed prior to installation to expose the adhesive layer.

During installation of flooring tiles (such as ceramic tiles), and/or other types of flooring or finish materials, the cavities 110 (opening to the top plane of the membrane) may be filled with mortar as mortar is applied to the top side surface of the membrane 100, thus allowing the flooring to be firmly adhered to the top surface of the membrane. After installation, when stress is exerted on the top surface of the installed flooring, mortar is pushed through the holes 120 to form attachment features (or "rivet heads") on the underside of the membrane. Such an arrangement may effectively decrement stress.

One of ordinary skill in the art will recognize that the membrane 100 may be implemented in various different ways without departing from the spirit of the invention. For instance, different embodiments may include cavities of different shape, size, position, and/or other differences. In addition, the membrane itself may be provided in various different ways (e.g., sheets of different size and/or shape, membranes of different thicknesses, etc.).

Figure 2:
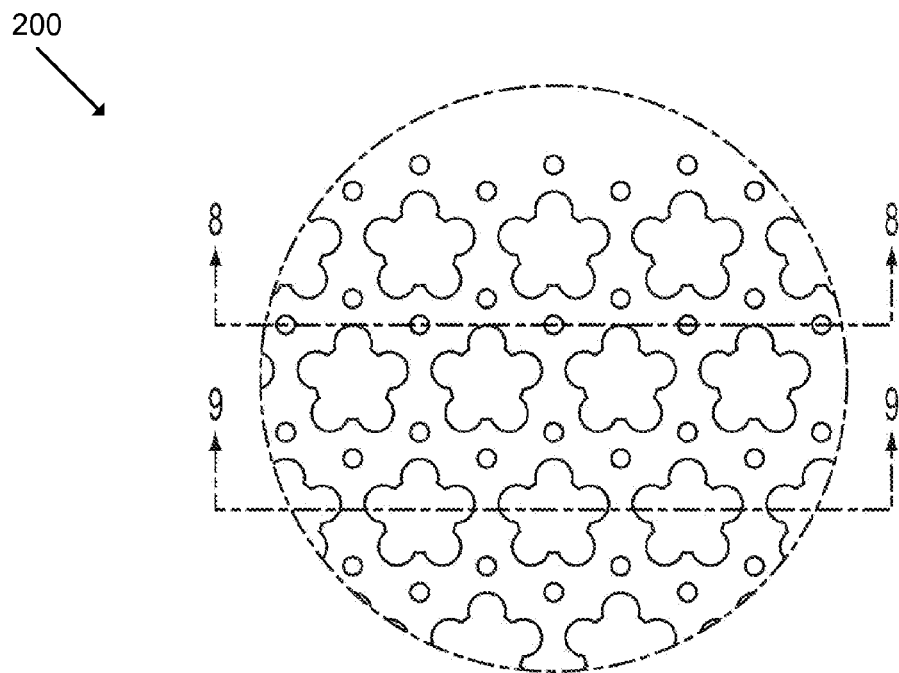
FIG. 2 illustrates a close-up top view of a portion of the decoupling membrane of FIG. 1.
Figure 3:
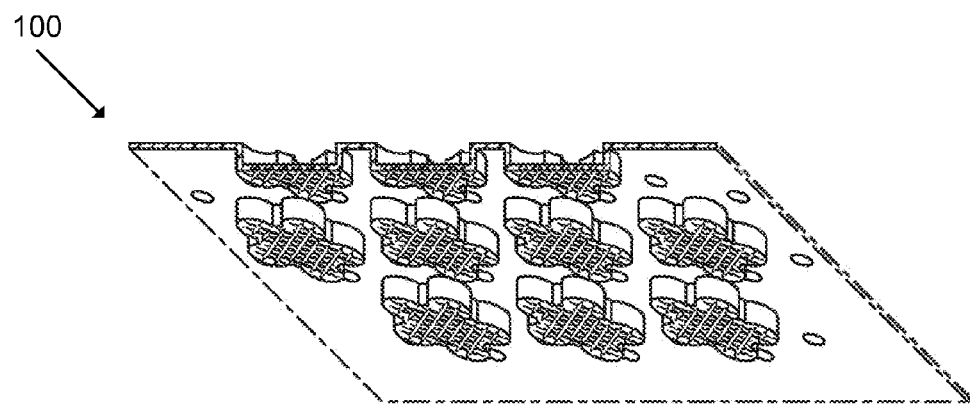
FIG. 3 illustrates a perspective cross-section view of the decoupling membrane of FIG. 1.
Figure 4:
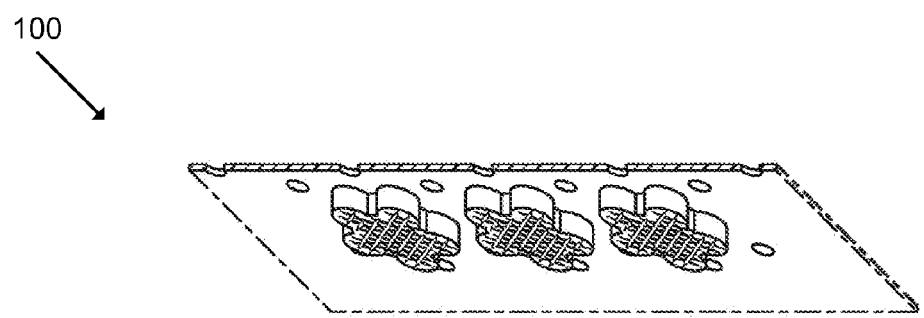
FIG. 4 illustrates an alternative perspective cross-section view of the decoupling membrane of FIG. 1.

FIG. 2 illustrates a close-up top view of a portion 200 of the decoupling membrane 100. FIG. 3 illustrates a perspective cross-section view of the decoupling membrane 100 along line 9-9 of FIG. 2. As shown, the cavities 110 open to the top surface of the decoupling membrane 100 such that mortar applied to the top surface will fill the cavities. FIG. 4 illustrates an alternative perspective cross-section view of the decoupling membrane 100 along line 8-8 of FIG. 2.

Figure 5:
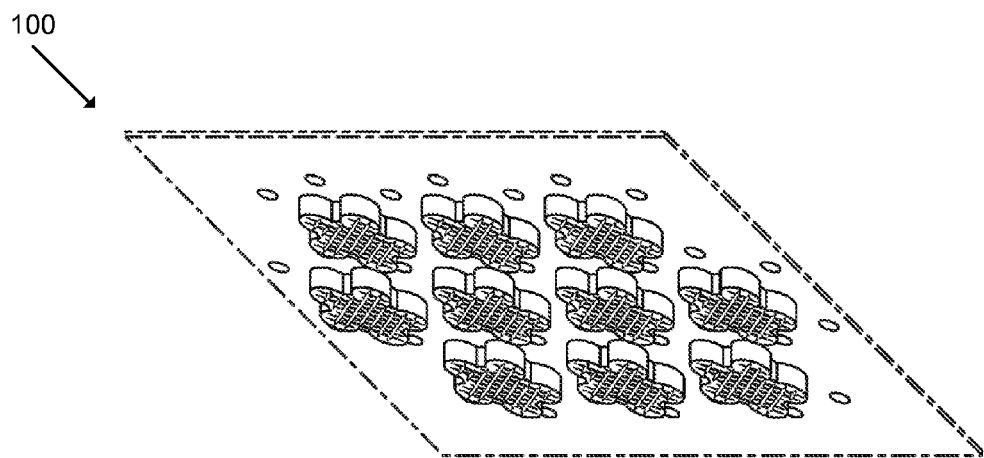
FIG. 5 illustrates a bottom perspective view of the decoupling membrane of FIG. 1.
Figure 6:
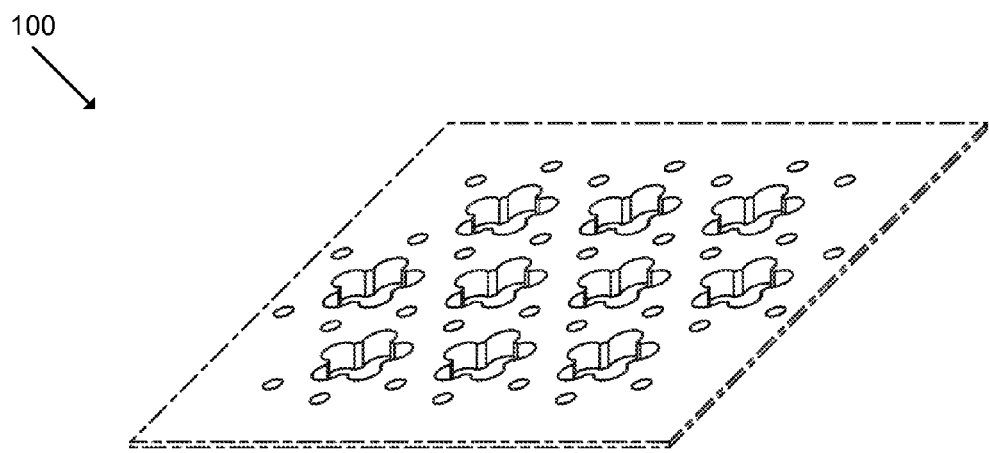
FIG. 6 illustrates a top perspective view of the decoupling membrane of FIG. 1.

FIG. 5 illustrates a bottom perspective view of the decoupling membrane 100. This figure highlight the underside surface of the membrane cavities, which may be a textured surface adapted to enhance adhesion between the underside surface and the subfloor. FIG. 6 illustrates a top perspective view of the decoupling membrane 100.

Figure 7:
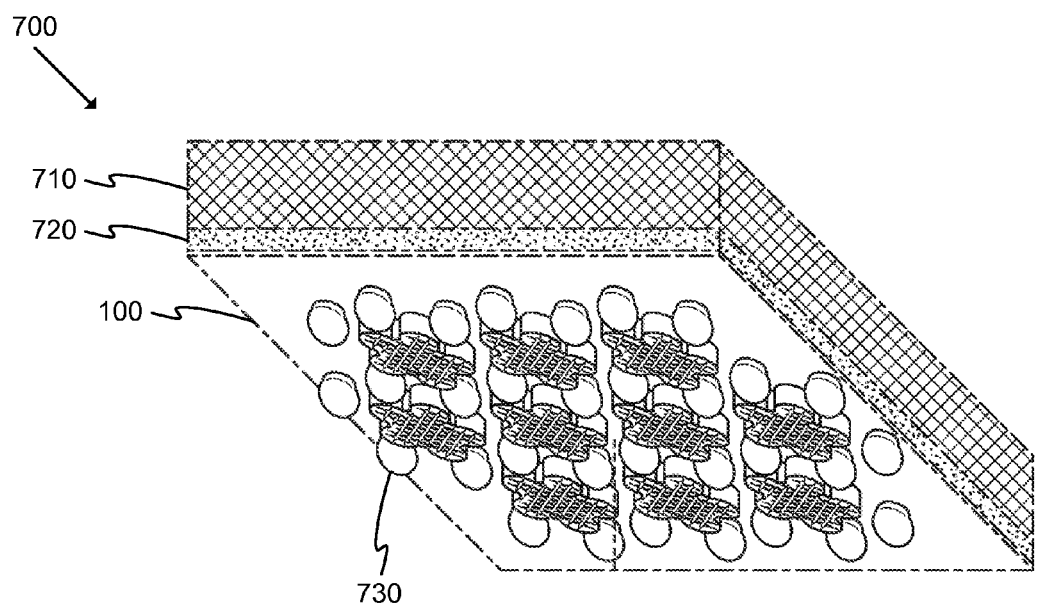
FIG. 7 illustrates a bottom perspective view of the decoupling membrane of FIG. 1 as installed.

FIG. 7 illustrates a bottom perspective view of the decoupling membrane 100 as installed. In this figure, the subfloor and adhesive layer are omitted for clarity. As shown, the installation 700 includes a flooring layer 710, a mortar layer 720, the membrane 100, and a set of rivet heads 730. The rivet heads may be formed as the mortar passes through escaping holes in the membrane 100. Such rivet heads 730 may help secure the mortar and flooring to the membrane 100. In addition, the escaping holes may be sized such that the rivet heads 730 do not completely block the drainage channels formed among the filled cavities.

Figure 8:
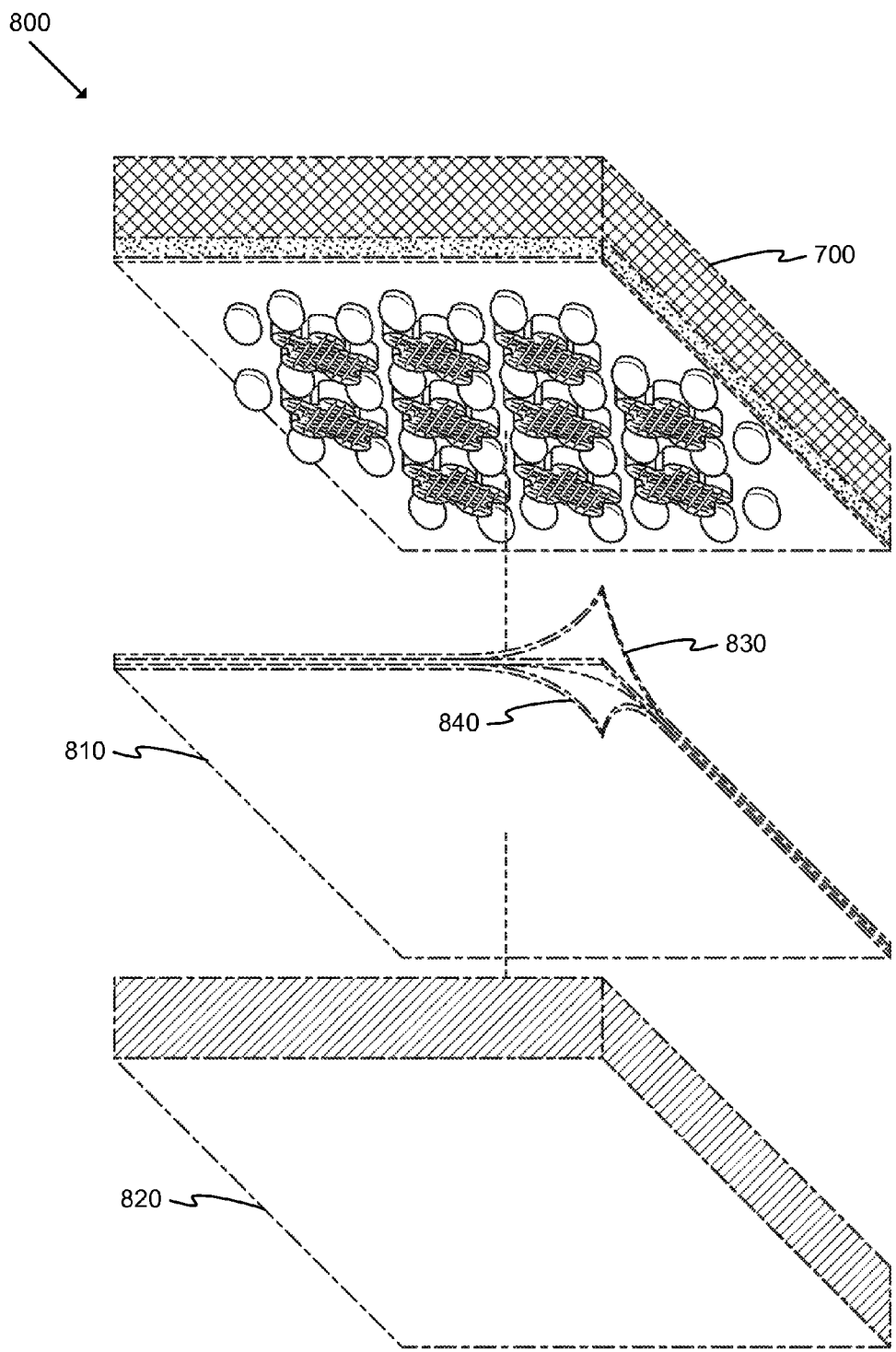
FIG. 8 illustrates an exploded bottom perspective view of the decoupling membrane of FIG. 1 as installed.

FIG. 8 illustrates an exploded bottom perspective view of the decoupling membrane 100 as installed. As shown, the installation 800 includes the installation 700 described above in reference to FIG. 7. In addition, installation 800 shows a peel and stick layer 810 and a subfloor 820. The subfloor may be any appropriate material (e.g., plywood, concrete, etc.).

The peel and stick layer 810 in this example includes a first release liner 830 and a second release liner 840. The first release liner 830 may typically be removed when manufacturing the membrane such that the layer 810 may be attached to the bottom surface of the membrane 100. Alternatively, an adhesive may be applied to the layer 810 (and/or the bottom surface of the membrane 100) and the layer 810 adhered to the bottom surface of the membrane 810 without use of the first release liner. The second release liner 840 may be removed just prior to attaching the membrane 100 to the subfloor 820. In some embodiments, the layer 810 may include a carrier which has adhesive on both sides (covered by the release liners 830-840).

In some embodiments, one or both release liners 830-840 may be divided into multiple sections for each section of membrane 100. Such "split" release liners may allow an installer to more easily remove the liner (especially from the non-flat bottom surface of the membrane). Some embodiments may include an attached tab or other graspable portion attached to the liner such that an installer may easily peel away the liner.

Figure 9:
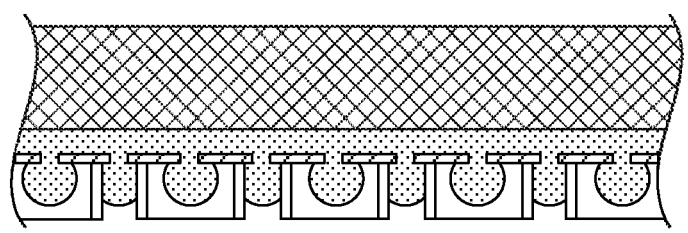
FIG. 9 illustrates a side view of the decoupling membrane of FIG. 1 as installed.
Figure 10:
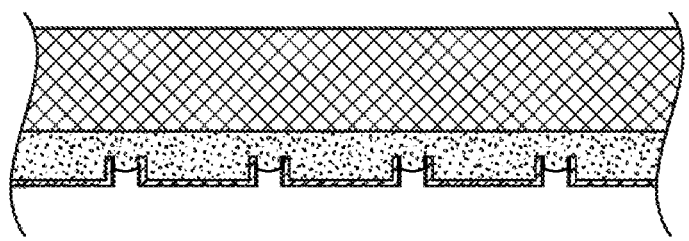
FIG. 10 illustrates an alternative side view of the decoupling membrane of FIG. 1 as installed.

FIG. 9 illustrates a side view of the decoupling membrane 100 as installed. FIG. 10 illustrates an alternative side view of the decoupling membrane 100 as installed.

The advantages of a decoupling membrane as described above are numerous. A peel-and-stick membrane (incorporating, for example, pressure sensitive acrylic (PSA) or rubber based adhesive affixed to bottom plates of cavities and release liner sheet) enables dramatically quicker, easier installation of the membrane directly to a subfloor.

The peel and stick three-part layer created via paper release liner being peeled away from the adhesive and adhesive carrier (which remain intact across the bottom plane of the membrane), as affixed to the collective bottom planes of each cavity, enables the membrane to be adhered to the subfloor as one uniform element. This yields a vastly superior and installer-friendly product as opposed to continuous roll membranes that require adhesive mortar to be applied to and penetrated into fine-mesh screen fabric webbing (attached to the underside of the membrane) to become interlocked in the webbing so as to anchor the membrane to a subfloor, as is the case for the conventional membranes.

Tenacious bond strength is enabled between flooring tiles (such as ceramic tiles) and the membrane via the mortar-penetrating punch holes. After peel-and-stick installation of a disclosed membrane to a subfloor, in preparing to install ceramic tiles, mortar is spread across surface of the disclosed membrane. Mortar both fills cavities and penetrates and perforates through the holes located across the top plane of the disclosed membrane and placed between the cavities. Mortar protrudes through holes in the top surface, then expands below around underside of the surface edge of the holes and creates expanded heads of mortar on underside of the top surface, similar to a rivet head. The mortar then cures, leaving a securing rivet head on the underside and preventing the mortar/tile assembly from separating from the membrane. These punch holes effectively decrement the stress difference and lateral tension across the surface layer of the membrane.

The exemplary five-pronged star-shaped cavity design maximizes cavity wall surface area to which mortar cement affixes during ceramic tile installation process. By incorporating these five decagon-angled protuberances, the spread-out star configuration (or other similar configurations) facilitates a greatly increase total cavity inside wall surface area as compared to square or rectangular cavities. Such increased surface area provides more surface area extant for mortar to affix, thus strengthening the flooring bond to the decoupling membrane.

Each cavity wall may be perpendicular to the bottom surface of each cavity. By squaring off the interior of each cavity at the inside wall and base of each cavity, the bottom underside surface area (on each cavity onto which peel-and-stick adhesive may adhere) is effectively maximized. This allows more contiguous surface area on the bottom of each cavity onto which the applied PSA and accompanying release liner are able to adhere.

The textured underside bottom surface plane of each cavity creates a more dynamic surface and maximizes gripping engagement between the adhesive carrier and cavity bottom. This in turn creates stronger adhesive bonds between a subfloor and the bottom of each cavity and between a subfloor and the underside of a disclosed membrane as whole.

The offset interlocking pattern of channels between the star shaped cavity pockets allows for vapor equalization and allow for the membrane to be able to be installed over, for instance, incompletely cured concrete. In some embodiments, the adhesive layer on the bottom of the membrane may include perforations that allow moisture to pass through the adhesive layer (which may include a carrier or substrate layer that the adhesive adheres to) and reach the channels. Such perforations may be evenly spaced throughout the layer (e.g., every one quarter inch) and may be sized appropriately for the subfloor material type.

The vertical inside slope of each cavity enables easy fabrication and facilitates easy removal of the membrane from a mold, thus enabling easy workability from mold into volume production. Alternatively, the membrane may be formed by pressing a die into a sheet of material, where the vertical slope allows the die to be pressed directly perpendicular to the sheet. This design facilitates a straightforward mold release process, and enables disclosed membranes to bypass mold release issues while maintaining substantial surface area both to facilitate mortar adhesion and accommodate lateral tension. As a skilled artisan readily appreciates, this is a significant manufacturing and production advantage over membrane designs utilizing cavities with so-called dove-tail negative angle cut backs, wherein specifically proprietary or patented equipment (e.g., a large cylindrical drum, gas propulsion extraction equipment, etc.) is required to both mold and extract membranes.

Figure 11:
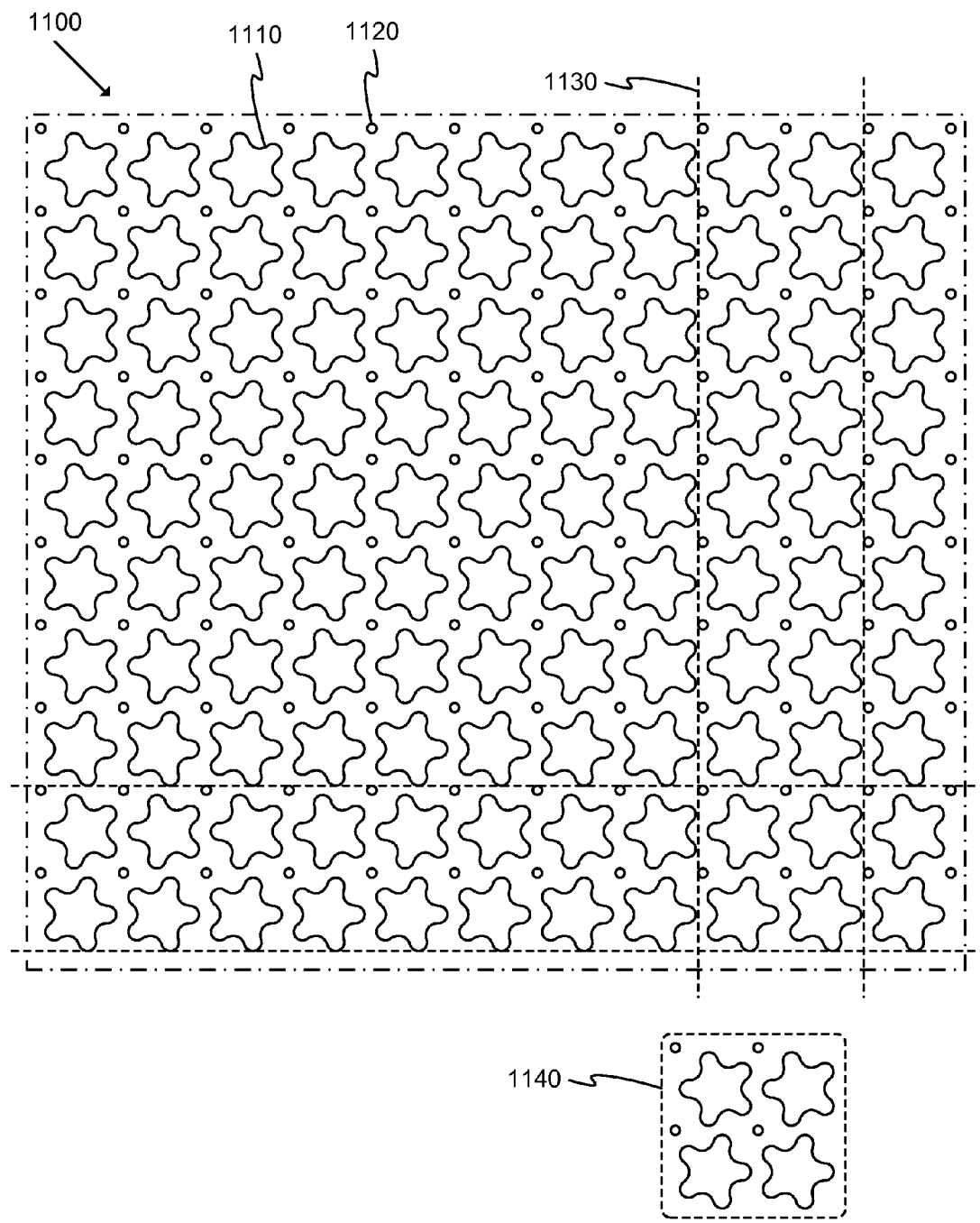
FIG. 11 illustrates a top view of an alternative decoupling membrane according to an exemplary embodiment of the invention.

FIG. 11 illustrates a top view of an alternative decoupling membrane 1100 according to an exemplary embodiment of the invention. Decoupling membrane 1100 may be substantially similar to decoupling membrane 100, with different cavities 1110 (and/or a different arrangement of cavities) and through-holes 1120 than those described above in reference to membrane 100.

This inter-locking (or "inter-leaving") pattern of cavities 1110 helps maximize the total available adhesion surface on the bottom of the membrane 1100, to which the self-adhering adhesive (e.g., an acrylic or rubberized adhesive), adhesive-bearing "carrier" (e.g., polyester) and release liner (either silicone treated paper or a thin plastic film) layer will adhere, thus allowing "peel-and-stick" installation.

The through holes 1120, which may be formed in various appropriate ways (e.g., using a set of hole punches), facilitate the penetration of thin set mortar (or "thin set") during flooring installation, which then cures onto the underside of the top of the membrane 1100 into a pattern of anchoring rivet head fasteners, augmenting the separate thin set mortar bonding created by the embedding and curing of mortar into the star-fish cavities 1110 on the top side of the membrane 1100.

As shown, in this example, each row of cavities 1110 is rotated one hundred eighty degrees from the adjacent rows of cavities. Such a configuration may allow the cavities to be placed in an overlapping (or nearly overlapping) arrangement that may maximize the surface area provided by the cavities (and thus maximize the surface area that is available to adhere to a subfloor, and, of course, provide support to the installed flooring or other finish layer) while still allowing a vapor channel formed by the spaces between the cavities on the underside of the installed membrane 1100.

The layout of cavities 1110 and holes 1120 may be associated with a set of X and Y axis lines 1130. For instance, in this example, a grouping 1140 of cavities and holes may be repeatedly stepped across the membrane 1100 to generate the desired overall layout.

The membranes of some embodiments may be manufactured at least partly using thermoforming, where a plastic sheet is heated to a pliable forming temperature, formed to a specific shape using a mold or die, and trimmed to create a usable product. The sheet, or "film" when referring to thinner gauges and certain material types (such as PVC), may be heated in an oven to a high-enough temperature that the sheet may be stretched into or onto a mold (or a mold may be pressed into or onto the sheet) and cooled to a finished shape.

Figure 12:
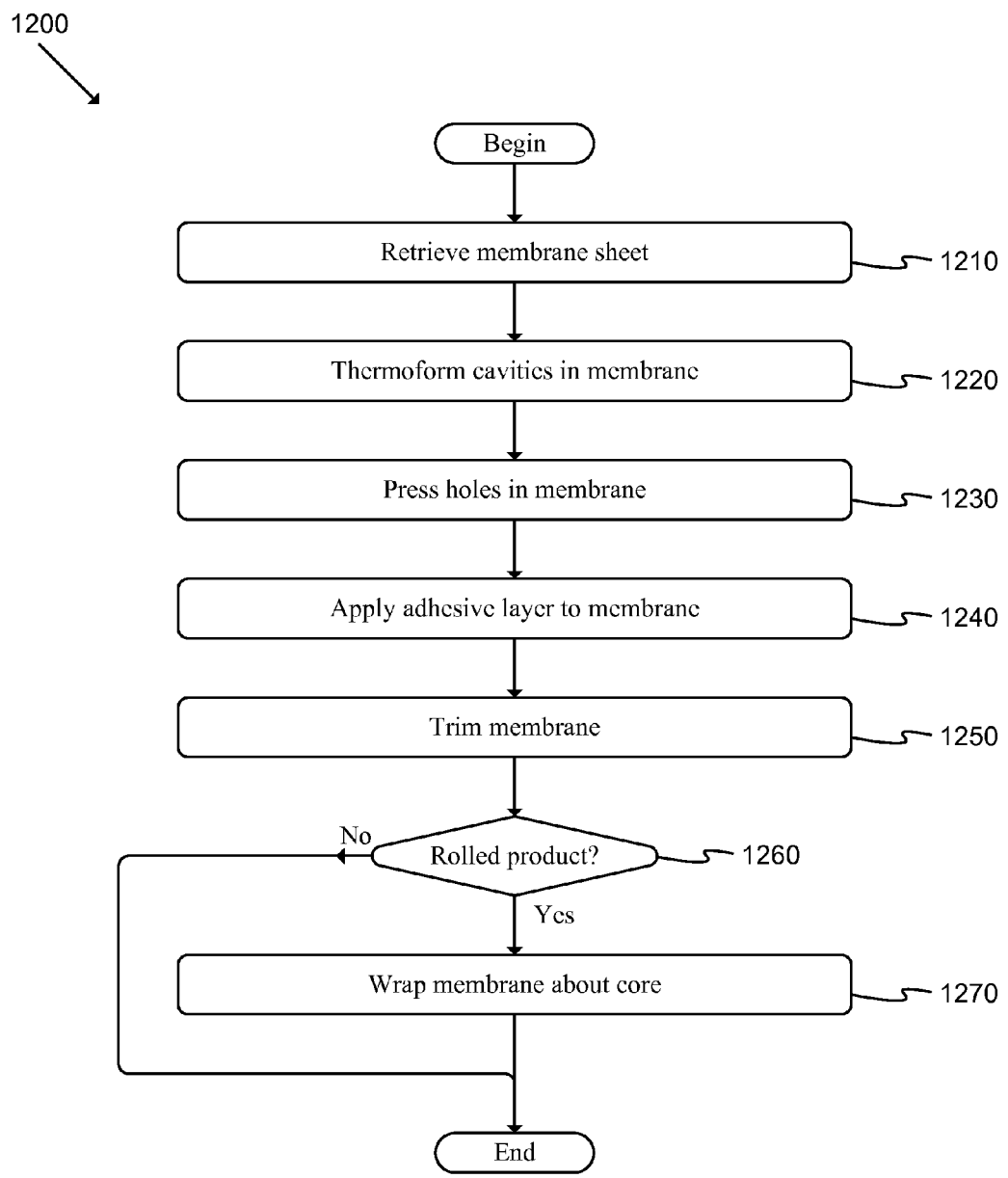
FIG. 12 illustrates a flow chart of a conceptual manufacturing process used by some embodiments.

FIG. 12 illustrates a flow chart of a conceptual manufacturing process 1200 used by some embodiments. Such a process may be implemented using automated equipment (e.g., computer controlled handlers, machines, etc.).

As shown, the process may retrieve (at 1210) a membrane sheet (e.g., a sheet of PVC). The process may then thermoform (at 1220) cavities in the membrane. Such cavities may alternatively be formed in other ways (e.g., using a mold).

Process 1200 may then press (at 1230) holes in the membrane (and/or otherwise form appropriate through holes). The process may then apply (at 1240) an adhesive layer to the membrane. Before application, the adhesive layer may be perforated using appropriate tooling (e.g., a set of punches of appropriate size) to allow moisture to pass through the layer. Next the process may trim (at 1250) the membrane sheet to the final size. The process may then determine (at 1260) whether the membrane is a rolled product. If the process determines that the membrane is not a rolled product, the process may end. If the process determines that the product is rolled, the process may wrap (at 1270) a length of the membrane about a core.

One of ordinary skill in the art will recognize that process 1200 is conceptual in nature and may be implemented in various ways without departing from the spirit of the invention. For instance, the operations may be performed in a different order. As another example, various additional operations may be included and/or listed operations omitted. The process may be implemented as part of a larger macro-process, or divided into a set of sub-processes.

The membrane of some embodiments, by avoiding overhangs and undercuts such as those embodied in existing membranes, can advantageously reduce manufacturing cost. The disclosed design reduces manufacturing cost while maintaining the functionalities of smoothing out stress differences, facilitating peel-and-stick installation and providing a channel for fluid to escape.

The membrane manufacturing process may utilize, for instance, a small tabletop (e.g., forty inches by forty-eight inches, forty inches by forty-four inches, etc.) machine, which may be used to heat small cut sections of plastic sheet and stretch the heated sheet over a mold using vacuum. A peel-and-stick adhesive layer may be applied to the bottom surface of the membrane. As above, some embodiments may provide a length of material on a flexible material that is able to be rolled about a core for ease of use during installation of flooring.

Other more complicated and cost-intensive thermoforming processes required by existing designs may involve wrapping a mold around a large (e.g., nine foot length) cylindrical drum. After a short form cycle, a burst of reverse air pressure is actuated from the vacuum side of the mold as the form tooling opens, commonly referred to as air-eject, to break the vacuum and assist the formed parts off of, or out of, the mold. A stripper plate may also be utilized on the mold as it opens for ejection of more detailed parts or those with negative-draft, undercut areas. The sheet containing the formed parts then indexes into a trim station on the same machine, where a die cuts the parts from the remaining sheet web, or indexes into a separate trim press where the formed parts are trimmed.

During installation of existing membranes, an installer is required to mix and lay down a bed (e.g., three-eighths of an inch) of thin set mortar, then roll out and embed the membrane mat into the wet mortar, working around/through the already-laid bed of mortar on the floor while laying down adjacent sections of mat, then wait overnight for the thin set to cure before beginning the tiling job (or other flooring or finish material installation) the following day.

Conversely, the peel and stick configuration of some embodiments may allow an installer to simply remove the release liner, press the decoupling membrane onto the subfloor and immediately begin a tiling project (or other finish project). This configuration results in a thinner profile, no downtime waiting for thin set to cure, and no additionally required setting materials. The installer may peel each panel (or sheet, rolled section, etc.) and lay the membrane down adjacent to a previously laid section.

The punch holes of some embodiments may be created using a tooling die which may be essentially a mounted series of awls, which, when heated, are depressed into the appropriate locations on top surface of top layer of the membrane. The depth to which the awls pierce the membrane may correspond to the diameter of the awls and thus determine the diameter of the punch holes (which results in appropriately sized rivet heads when thin set is applied to the top of the membrane).

The alternating rotating starfish design of some embodiments may allow intersecting X and Y axis lines delineating each grouping of four cavities (and/or other appropriate groupings). By rotating the angle of each starfish cavity within alternating rows, the design enables the distal end points of respective adjacent cavities to abut against a common imaginary grid line touched on also by distal ends of opposing cavities (i.e., nearly overlapping, or separated by a small distance).

Thus, each respective cavity may be touching and essentially sharing the same X and Y axis grid lines, via two or three extended "arms", with two or three extended arms from adjacent cavities, depending on the cavity position within the grid.

By alternately balancing the positioning relationship of the respective cavities, and maintaining each of their outward-facing (from within their grid) arms abutting to the common X or Y axis, the alternating rotating starfish design may effectively maintain a consistent uniform spacing between every cavity arm throughout the entire membrane, accompanied by consistent uniform interceding bridge strength throughout the entire membrane.

Each grouping of cavities may be defined as a square, with punch holes located along the edges of the square (and falling on the X and Y axis grid lines in some embodiments). Such groupings may maintain a uniform bridge wall between the cavities and punch holes. Such an approach maintains a uniform structural integrity of the entire membrane while affording distinct recesses and ports for thin set mortar adhesion and penetration on the top of the membrane and maximum possible surface area for adhesive layer adhesion on the bottom of the membrane.

Some PVC-based embodiments of the membrane may include anti-dioxins to prevent the membrane from rotting.

After removing each PVC membrane from the mold, perforating the membrane with punch holes, and allowing the membrane to cool, the bottom surface of the membrane may be contacted by an abrasive rigid surface, such that a sufficient portion of the bottom surface plane is abraded (or "scuffed"). This surface-roughing preparation (priming) step creates a more receptive surface onto which the peel and stick layer may be adhered.

It should be understood, of course, that the foregoing relates to illustrative details of exemplary embodiments of the invention and that modifications may be made without departing from the spirit and scope of the invention as defined by the following claims.

We claim:

1. A decoupling underlayment membrane comprising:
a set of mortar cavities;
a set of through holes; and
an adhesive layer coupled to an exterior surface of each mortar cavity in the set of cavities.

2. The decoupling underlayment membrane of claim 1, wherein each of the mortar cavities from the set of mortar cavities has a star-like shape with five rounded protuberances emanating from a center region of the cavity.

3. The decoupling underlayment membrane of claim 1, wherein each through hole in the set of through holes is sized such that an amount of mortar may pass through each hole to form a rivet head on the underside of the decoupling underlayment membrane such that the rivet head is able to secure a layer of mortar to a top surface of the decoupling underlayment membrane.

4. The decoupling underlayment membrane of claim 1, wherein the set of mortar cavities and the set of through holes are laid out in a repeating pattern.

5. The decoupling underlayment membrane of claim 1, wherein the decoupling underlayment membrane comprises polyvinyl chloride.

6. The decoupling underlayment membrane of claim 1, wherein the adhesive layer comprises at least one of pressure sensitive acrylic adhesive and rubber-based adhesive.

7. The decoupling underlayment membrane of claim 1, wherein the decoupling underlayment membrane is rolled about a cylindrical core.

8. A decoupling underlayment membrane comprising:
a set of starfish-shaped cavities arranged in a first repeating pattern and formed into a top surface of the membrane;
a set of through holes arranged in a second repeating pattern; and
a peel and stick adhesive layer coupled to a bottom surface of the membrane.

9. The decoupling underlayment membrane of claim 8, wherein the first repeating pattern comprises a first row of cavities and a second row of cavities orientated at one hundred eighty degrees of rotation from the orientation of the cavities in the first row of cavities.

10. The decoupling underlayment membrane of claim 8, wherein the first repeating pattern is defined by a set of four cavities.

11. The decoupling underlayment membrane of claim 8, wherein distal endpoints of each starfish-shaped cavity in the set of starfish-shaped cavities abut against a common grid line that is also abutted by distal end points of other starfish-shaped cavities in the set of starfish-shaped cavities.

12. The decoupling underlayment membrane of claim 8, wherein the decoupling underlayment membrane comprises polyvinyl chloride.

13. The decoupling underlayment membrane of claim 8, wherein the decoupling underlayment membrane is rolled about a cylindrical core.

\* \* \* \* \*